United States Patent
Guo

(10) Patent No.: US 12,262,203 B2
(45) Date of Patent: Mar. 25, 2025

(54) CONFIGURATION DATA UPDATE METHOD, APPARATUS, AND SYSTEM

(71) Applicant: Huawei Technologies Co., Ltd., Shenzhen (CN)

(72) Inventor: Longhua Guo, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 234 days.

(21) Appl. No.: 17/708,841

(22) Filed: Mar. 30, 2022

(65) Prior Publication Data

US 2022/0225098 A1    Jul. 14, 2022

Related U.S. Application Data

(63) Continuation of application No. PCT/CN2020/108497, filed on Aug. 11, 2020.

(30) Foreign Application Priority Data

Sep. 30, 2019   (WO) ................ PCT/CN2019/109528

(51) Int. Cl.
   *H04W 12/08* (2021.01)
   *H04W 12/106* (2021.01)
   (Continued)

(52) U.S. Cl.
   CPC ......... *H04W 12/08* (2013.01); *H04W 12/106* (2021.01); *H04W 48/02* (2013.01); *H04W 48/08* (2013.01); *H04W 76/30* (2018.02)

(58) Field of Classification Search
   CPC ... H04W 12/08; H04W 12/106; H04W 48/02; H04W 48/08; H04W 76/30; H04W 84/045; H04W 12/76
   See application file for complete search history.

(56) References Cited

U.S. PATENT DOCUMENTS 10,225,833 B2   3/2019   Yi et al.
2010/0161794 A1  6/2010   Horn et al.
(Continued)

FOREIGN PATENT DOCUMENTS

CN    101296451 A    10/2008
CN    102265653 A    11/2011
(Continued)

OTHER PUBLICATIONS

Prados-Garzon, Jonathan, et al. "5G non-public networks: Standardization, architectures and challenges." IEEE Access 9 (2021):153893-153908. (Year: 2021).*
(Continued)

*Primary Examiner* — Sharad Rampuria
(74) *Attorney, Agent, or Firm* — Conley Rose, P.C.

(57) ABSTRACT

A configuration data update, where the method includes: When configuration data for a terminal apparatus is first configuration data, where the first configuration data includes a first restriction indication and an empty closed access group (CAG) list, the first restriction indication is used to indicate the terminal apparatus to access a network through a CAG, an access and mobility management function apparatus configures the terminal apparatus to be in a state in which the terminal apparatus is allowed to access the network not only through a CAG in the CAG list. When the configuration data for the terminal apparatus is updated to second configuration data, where a CAG list in the second configuration data is not empty or does not include the first restriction indication, the access and mobility management function apparatus sends the second configuration data to the terminal apparatus.

23 Claims, 7 Drawing Sheets

(51) Int. Cl.
*H04W 48/02* (2009.01)
*H04W 48/08* (2009.01)
*H04W 76/30* (2018.01)

(56) References Cited

U.S. PATENT DOCUMENTS

| | | | |
|---|---|---|---|
| 2011/0171915 A1 | 7/2011 | Gomes et al. | |
| 2015/0264666 A1 | 9/2015 | Yi et al. | |
| 2020/0045660 A1 | 2/2020 | Lee et al. | |
| 2020/0314701 A1* | 10/2020 | Talebi Fard | H04W 36/0016 |
| 2020/0329422 A1* | 10/2020 | Sirotkin | H04W 48/18 |
| 2021/0092707 A1* | 3/2021 | Ryu | H04W 84/045 |
| 2021/0092708 A1* | 3/2021 | Ryu | H04W 76/27 |
| 2021/0385739 A1 | 12/2021 | Wang et al. | |
| 2022/0167260 A1* | 5/2022 | Chun | H04W 60/04 |
| 2022/0256450 A1* | 8/2022 | Kuge | H04W 60/04 |

FOREIGN PATENT DOCUMENTS

| | | |
|---|---|---|
| CN | 104782205 A | 7/2015 |
| CN | 109804679 A | 5/2019 |
| CN | 109983792 A | 7/2019 |
| CN | 110100407 A | 8/2019 |
| CN | 110213808 A | 9/2019 |
| EP | 3984282 A1 | 4/2022 |
| EP | 4014576 A1 | 6/2022 |
| WO | 2018085571 A1 | 5/2018 |
| WO | 2020262956 A1 | 12/2020 |
| WO | 2021034031 A1 | 2/2021 |

OTHER PUBLICATIONS

3GPP TS 23.501 V16.1.0, Jun. 2019, "3rd Generation Partnership Project; Technical Specification Group Services and System Aspects; System Architecture for the 5G System; Stage 2 (Release 16)," 367 pages.

MediaTek Inc., "Outstanding issues on Allowed CAG list and CAG-only indication," SA WG2 Meeting #133, May 13-17, 2019, Reno, NV, USA, S2-1905208, 3 pages.

InterDigital, Inc., "CAG-only indication and empty Allowed CAG list," 3GPP TSG-SA WG2 Meeting #134, Sapporo, Japan, Jun. 24-28, 2019, S2-1907416, 4 pages.

Huawei, et al., "CAG-only indication and empty Allowed CAG list," 3GPP TSG-WG SA2 Meeting #135, Split, Croatia, Oct. 14-18, 2019, S2-1908858, 5 pages.

InterDigtial, Inc., CAG-only indication and empty Allowed CAG list. 3GPP TSG-SA WG2 Meeting #135, Split, Croatia, Oct. 14-Oct. 18, 2019, S2-1909563, 5 pages.

"Technical Specification Group Core Network and Terminals; Non-Access Stratum (NAS) protocol for 5G System (5GS); Stage 3 (Release 16)," 3GPP TS 24. 501, V16.2.0, Sep. 2019, XP051802407, 608 pages.

"3rd Generation Partnership Project; Technical Specification Group Services and System Aspects; System Architecture for the 5G System (5GS); Stage 2 (Release 16)," 3GPP TS 23.501, V16.2.0, Sep. 2019, XP051784669, 391 pages.

* cited by examiner

CONFIGURATION DATA UPDATE METHOD, APPARATUS, AND SYSTEM

CROSS-REFERENCE TO RELATED APPLICATIONS

This is a continuation of International Patent Application No. PCT/CN2020/108497, filed on Aug. 11, 2020, which claims priority to International Patent Application No. PCT/CN2019/109528, filed on Sep. 30, 2019. The disclosures of the aforementioned applications are hereby incorporated by reference in their entireties.

TECHNICAL FIELD

This application relates to the field of communication technologies, and more specifically, to a configuration data update method, an apparatus, and a system.

BACKGROUND

A closed access group (CAG) technology mainly restricts access of a user equipment (UE) to a cell, and only a user that is allowed to access a CAG cell can access a core network through the CAG cell. An access network device may broadcast one or more CAG IDs, where each CAG ID is a CAG cell identifier (ID). The UE is configured with a CAG list that the UE is allowed to access, for example, a CAG ID list that the UE is allowed to access. After receiving a broadcast CAG ID, the UE attempts to access the core network through a current CAG cell if the CAG ID is in the CAG ID list allowed by the UE. The UE may be further configured with a CAG only indication, where the indication restricts that the UE can access a network system only through a CAG cell.

If the CAG list allowed by the UE is empty, and the UE is set to be CAG only, the UE can no longer access the network and cannot perform a configuration update procedure because no CAG cell is accessible for the UE and the UE is set to be CAG only.

SUMMARY

This application provides a configuration data update method and an apparatus, to implement configuration update on a UE.

According to a first aspect, this application provides a configuration data update method, including the following.

When configuration data for a terminal apparatus is first configuration data, where the first configuration data includes a first restriction indication and an empty CAG list, the first restriction indication is used to indicate the terminal apparatus to access a network through a CAG, and the CAG list is a set of CAG IDs that the terminal apparatus is allowed to access, an access and mobility management function apparatus configures the terminal apparatus to be in a state in which the terminal apparatus is allowed to access the network not only through a CAG in the CAG list.

When the configuration data for the terminal apparatus is updated to second configuration data, where a CAG list in the second configuration data is not empty or does not include the first restriction indication, the access and mobility management apparatus sends the second configuration data to the terminal apparatus.

In a possible implementation, the access and mobility management function apparatus sends, to the terminal apparatus, the first configuration data from which the first restriction indication is removed, where the first configuration data from which the first restriction indication is removed is used to configure that the terminal apparatus is allowed to access the network not only through the CAG.

In a possible implementation, the access and mobility management function apparatus does not send the first configuration data to the terminal apparatus, where the empty CAG list is used to replace a non-empty CAG list stored in the terminal apparatus.

In a possible implementation, the first configuration data from which the first restriction indication is removed includes first indication information, where the first indication information is used to indicate that the terminal apparatus is allowed to access the network not only through the CAG.

In a possible implementation, the access and mobility management function apparatus sends an identifier of at least one default CAG to the terminal apparatus, where the default CAG is used by the terminal apparatus to update configuration data.

In a possible implementation, the access and mobility management apparatus uses a non-access stratum (NAS) security context to perform confidentiality and/or integrity protection on a reject message or a configuration update message.

In a possible implementation, when the NAS security context in the access and mobility management apparatus is unavailable, the access and mobility management apparatus sends the second configuration data after activating the NAS security context.

In a possible implementation, the access and mobility management apparatus sends second indication information to the terminal apparatus, where the second indication information is used to indicate that the terminal apparatus is allowed to access the network not only through the CAG, or is allowed to access the network not only through a CAG cell in an allowed CAG list.

In a possible implementation, a base station broadcasts CAG information including third indication information, where the third indication information is used to indicate the terminal apparatus to access the network through a CAG cell corresponding to the third indication information when the terminal apparatus is in an empty state or there is no available CAG cell.

UE is configured, for example, an ID of a default or special CAG cell is allocated, such that the UE can perform configuration data update with a network side through the default CAG cell. Alternatively, a CAG only state of the UE is cancelled, such that the UE can access the network through a non-CAG cell to perform configuration update. It should be noted that, the default CAG cell is not included in the CAG list, and may also be used as a default configured CAG cell and used as a part of the CAG list stored by the UE.

According to a second aspect, this application provides a configuration data update method, including the following.

When configuration data for a terminal apparatus is first configuration data, where the first configuration data includes a first restriction indication and an empty CAG list, the first restriction indication is used to indicate the terminal apparatus to access a network through a CAG, and the CAG list is a set of CAG IDs that the terminal apparatus is allowed to access, the terminal apparatus is configured to be in a state in which the terminal apparatus is allowed to access the network not only through a CAG in the CAG list. When the configuration data for the terminal apparatus is updated to second configuration data, where a CAG list in the second configuration data is not empty or does not include the first restriction indication, the terminal apparatus receives the second configuration data from an access and mobility management apparatus.

According to a third aspect, this application provides another configuration data update method, including the following.

When configuration data for a terminal apparatus in a configuration data management apparatus is first configuration data, where the first configuration data includes a first restriction indication and an empty CAG list, the first restriction indication is used to indicate the terminal apparatus to access a network through a CAG, and the CAG list is a set of CAG IDs that the terminal apparatus is allowed to access, the configuration data management apparatus does not send the empty CAG identifier list to the terminal apparatus.

When the configuration data for the terminal apparatus is updated to second configuration data, where a CAG list in the second configuration data is not empty or does not include the first restriction indication, an access and mobility management apparatus sends the second configuration data to the terminal apparatus.

In a possible implementation, the configuration data management apparatus is a unified data management network element. When configuration data in the unified data management network element is the first configuration data, the unified data management network element adds an identifier of the terminal apparatus to a forbidden list and forbids the terminal apparatus from accessing the network. When the configuration data in the unified data management network element is updated to the second configuration data, the unified data management network element removes the identifier of the terminal apparatus from the forbidden list.

In a possible implementation, the configuration data management apparatus is the unified data management network element, and the unified data management network element sends second restriction indication information to the access and mobility management function apparatus.

In a possible implementation, the configuration data management apparatus is the unified data management network element; and after removing the first restriction indication from the first configuration data, the unified data management network element sends the first configuration data to the access and mobility management function apparatus.

According to a fourth aspect, this application provides a configuration data update apparatus. The apparatus may be a terminal device, or may be a chip used in the terminal device. The apparatus has a function of implementing the embodiments of the third aspect. The function may be implemented by hardware, or may be implemented by hardware executing corresponding software. The hardware or the software includes one or more modules corresponding to the function.

According to a fifth aspect, this application provides a configuration data update apparatus. The apparatus may be an access and mobility management function apparatus, or may be a chip used in an access and mobility management function network element. The apparatus has a function of implementing the first aspect or the embodiments of the first aspect and the third aspect. The function may be implemented by hardware, or may be implemented by hardware executing corresponding software. The hardware or the software includes one or more modules corresponding to the function.

According to a sixth aspect, this application provides a configuration data update apparatus. The apparatus may be a unified data management network element, or may be a chip used in the unified data management network element. The apparatus has a function of implementing the third aspect or the embodiments of the third aspect. The function may be implemented by hardware, or may be implemented by hardware executing corresponding software. The hardware or the software includes one or more modules corresponding to the function.

According to a seventh aspect, this application provides a configuration data update apparatus, including a processor and a memory. The memory is configured to store computer-executable instructions. When the apparatus runs, the processor executes the computer-executable instructions stored in the memory, such that the apparatus performs the methods according to the foregoing aspects. The apparatus may be a terminal device, a chip used in the terminal device, an access and mobility management network element, a chip used in the access and mobility management network element, a unified data management network element, or a chip used in the unified data management network element.

According to an eighth aspect, this application provides a configuration data update apparatus, including a unit or means configured to perform the steps in the foregoing aspects. The apparatus may be an access and mobility management network element, a terminal device, or a unified data management network element.

According to a ninth aspect, this application provides a configuration data update apparatus, including a processor and an interface circuit. The processor is configured to implement the methods according to the foregoing aspects through an interface circuit. There are one or more processors. The apparatus may be a chip used in an access and mobility management network element, a chip used in a terminal device, or a chip used in a unified data management network element.

According to a tenth aspect, this application provides a configuration data update apparatus, including a processor, configured to be connected to a memory, and configured to invoke a program stored in the memory, to perform the methods according to the foregoing aspects. The memory may be located inside the apparatus, or may be located outside the apparatus. In addition, there are one or more processors. The apparatus may be a terminal device, a chip used in the terminal device, an access and mobility management network element, a chip used in the access and mobility management network element, a unified data management network element, or a chip used in the unified data management network element.

According to an eleventh aspect, this application further provides a computer-readable storage medium. The computer-readable storage medium stores instructions. When the instructions are run on a computer, a processor is enabled to perform the methods according to the foregoing aspects.

According to a twelfth aspect, this application further provides a computer program product including instructions. When the computer program product is run on a computer, the computer is enabled to perform the methods according to the foregoing aspects.

According to a thirteenth aspect, this application further provides a chip system. The chip system includes a processor, configured to perform the methods according to the foregoing aspects.

DESCRIPTION OF EMBODIMENTS

Figure 1:
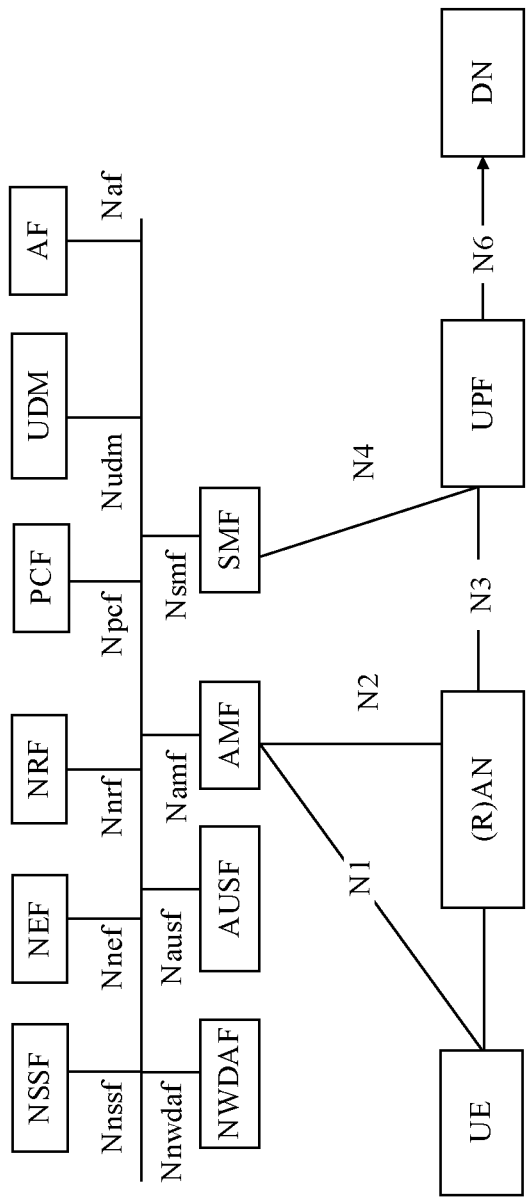
FIG. 1 is a schematic diagram of a possible network architecture to which this application is applicable.

The following describes technical solutions in this application with reference to the accompanying drawings.

The technical solutions in embodiments of this application may be applied to various communication systems, such as a global system for mobile communications (GSM), a code division multiple access (CDMA) system, a wideband code division multiple access (WCDMA) system, a general packet radio service (GPRS) system, a Long-Term Evolution (LTE) system, an LTE frequency-division duplex (FDD) system, an LTE time-division duplex (TDD) system, a universal mobile telecommunications system (UMTS), a Worldwide Interoperability for Microwave Access (WiMAX) communication system, a 5th generation (5G) system or a new radio (NR) system, and a possible communication system in the future.

A terminal apparatus in embodiments of this application may be a chip, a user equipment, an access terminal, a subscriber unit, a subscriber station, a mobile station, a remote station, a remote terminal, a mobile device, a user terminal, a terminal, a wireless communication device, a user agent, or a user apparatus. The terminal apparatus may alternatively be a cellular phone, a cordless phone, a Session Initiation Protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal apparatus in a 5G network, a terminal apparatus in a future evolved public land mobile network (PLMN), or the like. This is not limited in embodiments of this application.

A core network (CN) device in embodiments of this application may be a control plane anchor of a terminal apparatus, and provides functions such as registration area update for a terminal. For example, a core network apparatus may include an access and mobility management function (AMF) entity. The core network apparatus may be a network device configured to provide functions such as core network access and mobility management for the terminal. A function of the core network apparatus may be similar to a function of a mobility management entity (MME) in an LTE system.

An access network apparatus in embodiments of this application may be a device configured to communicate with a terminal apparatus, and the access network apparatus may be a radio access network (RAN) device. The RAN device may include various types of base stations. For example, the base stations in embodiments of this application may include macro base stations, micro base stations, relay stations, access points, and the like in various forms. In systems using different radio access technologies, names of devices with base station functions may be different. For example, in an LTE network, a device with a base station function is referred to as an evolved NodeB (eNB or eNodeB). In a 3rd generation (3G) network, a device with a base station function is referred to as a NodeB. In a 5th generation (5G) network, a device with a base station function may be referred to as a gNodeB (gNB) or the like. This is not limited in embodiments of this application.

In addition, in embodiments of this application, the access network device provides a service for a cell, and the terminal apparatus communicates with a network device using a transmission resource (for example, a frequency domain resource or a spectrum resource) used in the cell. The cell may be a cell corresponding to the network device (for example, a base station). The cell may belong to a macro base station, or may belong to a base station corresponding to a small cell. Herein, the small cell may include: a metro cell, a micro cell, a pico cell, a femto cell, and the like, and the small cell has features of small coverage and low transmit power, and is applicable to providing a high-rate data transmission service.

The technical solutions in embodiments of this application may be applied to a 5G system. The following describes the 5G system with reference to FIG. 1.

FIG. 1 is a schematic diagram of an architecture of a 5G system.

The system architecture shown in FIG. 1 includes a user equipment (UE), a radio access network (RAN), an access and mobility management function network element (AMF), a session management function network element (SMF), a user plane function network element (UPF), a policy control function network element (PCF), a unified data management function network element (UDM), an authentication server function entity (AUSF), and a data network module (DN).

Main functions of devices in a core network in the system architecture shown in FIG. 1 are as follows.

The AMF is mainly used for mobility management, access management, and the like, and may be used to implement functions other than session management in functions of a mobility management entity (MME), for example, functions such as lawful interception and access authorization/authentication.

The session management function (SMF) is mainly used for session management, internet protocol (IP) address allocation and management of a terminal apparatus, manageable user plane function selection, a termination point of a policy control and charging function interface, downlink data notification, and the like.

The user plane function (UPF) has a main function of routing and forwarding a data packet, and may be used as a mobility anchor or an uplink classifier to support routing of a service flow to a data network, or may be used as a branch point to support a multi-homed packet data unit (PDU) session, and the like.

The policy control network element (PCF) has a main function of a policy decision point, and provides rules for service flow detection, application detection, gating control, quality of service (QOS), and flow-based charging control.

The (radio) access network ((R)AN) is used to provide a network access function for an authorized user in a specific area, and can use transmission tunnels with different quality based on user levels, service requirements, and the like. The (R)AN network element can manage a radio resource, provide an access service for a terminal apparatus, and complete forwarding of a control signal and user data between the terminal apparatus and a core network. The (R)AN network element may alternatively be understood as a base station in a conventional network, and an interface between an AMF network element and a RAN device is referred to as an N2 interface.

The AUSF is mainly used for user authentication and the like.

An application function (AF) is used for interaction with a 3rd Generation Partnership Project (3GPP) core network, to provide a service. The interaction includes interaction with an NEF, interaction with a policy architecture, and the like. Main functions of the network exposure function (NEF) include: securely opening, to inside, a third party, or the like, a service and a capability that are provided by a 3GPP network function; and converting or translating information exchanged with the AF and information exchanged with an internal network function, for example, an AF service identifier and internal 5G core network information such as a data network name (DNN) and Single Network Slice Selection Assistance Information (S-NSSAI).

The NEF is used to securely open, to outside, a service, a capability, and the like that are provided by a 3GPP network function.

The unified data management (UDM) is used for user identifier processing, 3GPP authentication supporting, access authentication, registration, mobility management, and the like.

For the UE, refer to descriptions of a terminal apparatus or a terminal device in this application. The terminal apparatus may alternatively be a chip apparatus. In addition, the terminal apparatus or the UE stores a long-term key and a related function. When performing bidirectional authentication with a core network element (for example, an AMF or an AUSF), the UE verifies authenticity of a network using the long-term key and the related function.

It should be noted that names of the network elements (such as the SMF, the AF, and the UPF) included in FIG. 1 are merely names, and the names do not constitute any limitation on the functions of the network elements. In a 5G network and another future network, the foregoing network elements may also have other names. This is not specifically limited in embodiments of this application. For example, in a 6G network, some or all of the foregoing network elements may still use terms in 5G, or may have other names. Unified descriptions are provided herein, and details are not described below again.

It should be understood that the foregoing network architecture used in embodiments of this application is merely an example of a network architecture for description, and a network architecture applicable to embodiments of this application is not limited thereto. Any network architecture that can implement the functions of the foregoing network elements is applicable to embodiments of this application.

A non-public network (NPN) is a system deployed for a non-public purpose. An NPN integrated by public networks may be an NPN network deployed with support of the public network. A closed access group (CAG) technology mainly restricts access of UE to a cell, and only a user (e.g., UE) that is allowed to access a CAG cell can access a network such as a core network through the CAG cell. In a CAG mechanism, a group of specific users are allowed to access cells of one or more closed access groups. The closed access group is used in an NPN network served by a public network, and rejects an unallowed terminal to access the NPN network through a related cell. One CAG cell may broadcast one or more CAG IDs, where the CAG ID is a CAG cell identifier.

The UE is configured with a CAG list that the UE is allowed to access, that is, a CAG ID list indicating a CAG cell that the UE is allowed to access. After receiving a broadcast CAG ID, the UE attempts to access the core network through a current CAG cell if the received CAG ID is in the CAG ID list allowed by the UE. The UE may be further configured with a CAG only indication. The indication is used to indicate that the UE can access the network only through a CAG cell. The UE that can access the network only through the CAG cell is considered to be in a CAG only state, and the CAG only state may also be referred to as an empty state. If the CAG list allowed by the UE is empty, and the UE is set to be CAG only, the UE cannot access the network and cannot perform a configuration update procedure because no CAG cell is accessible for the UE and the UE is set to be CAG only. Even if the UE is configured with an accessible CAG list, or when there is no CAG only restriction, and no available CAG cell or public-network cell in network coverage in which the UE is located, the UE cannot access the network and cannot perform the configuration update procedure.

If the UE is allowed to be used only in a non-public network scenario, the UE is set to be CAG only. At the beginning, the UE is allowed to access the network within a range of CAG A. However, after a period of time, a task in the range of CAG A ends, such that an identifier of CAG A needs to be deleted from identifiers of cells that can be accessed by the UE. After deletion, there is no accessible CAG cell for the UE. In this case, the UE is still CAG only, but the UE can no longer access the network. In another possible scenario, when a task in the range of CAG A ends, and the UE is moved to another position not covered by CAG A, the UE cannot select an accessible CAG cell, and the UE can no longer access the network. This application defines a state in which a terminal apparatus is allowed to access a network not only through a CAG in a CAG list, that is, the terminal apparatus in this state may still be allowed to access the network only through the CAG, but may use a CAG cell that is not in the CAG list that the terminal apparatus is allowed to access, for example, use at least one default CAG cell preconfigured for the UE or a default CAG cell delivered by a network side to the UE. The state may alternatively be that the terminal apparatus is no longer restricted to accessing the network through the CAG cell, that is, the terminal apparatus is in a non-CAG only state, which may also be referred to as a non-empty state, and the terminal apparatus may access the network through a non-CAG cell. For the terminal apparatus in this state, configuration data on the network side is that the terminal is allowed to access the network only through the CAG, but the terminal apparatus may use another cell that is not in the CAG list that the terminal apparatus is allowed to access.

Configuration data of UE in this application may also be referred to as configuration information, subscription data, or subscription information, and includes a list of CAG cells that the UE is allowed to access and an indication indicating whether the UE is allowed to access a network only through a CAG. The list of CAG cells, that is, a CAG list, includes an ID of the CAG that the UE is allowed to access. Indications indicating whether the UE is allowed to access the network only through the CAG includes a CAG only indication and a non-CAG only indication. The CAG only indication indicates that the UE is allowed to access the network only through the CAG, and the non-CAG only indication indicates that whether the UE accesses the network through the CAG is not restricted.

First configuration data in embodiments of this application includes an empty CAG list and a first restriction indication, where the first restriction indication is a CAG only indication. Second configuration data in embodiments of this application includes a non-empty CAG list and a CAG only indication. Alternatively, the second configuration data includes a non-CAG only indication, and optionally, further includes an empty CAG list.

When an AMF needs to modify CAG information on the UE, integrity protection needs to be performed on configuration data sent by the AMF to the UE. When the UE receives an integrity-protected message and an integrity check succeeds, the UE updates configuration data of the UE based on content in the configuration data.

Figure 2:
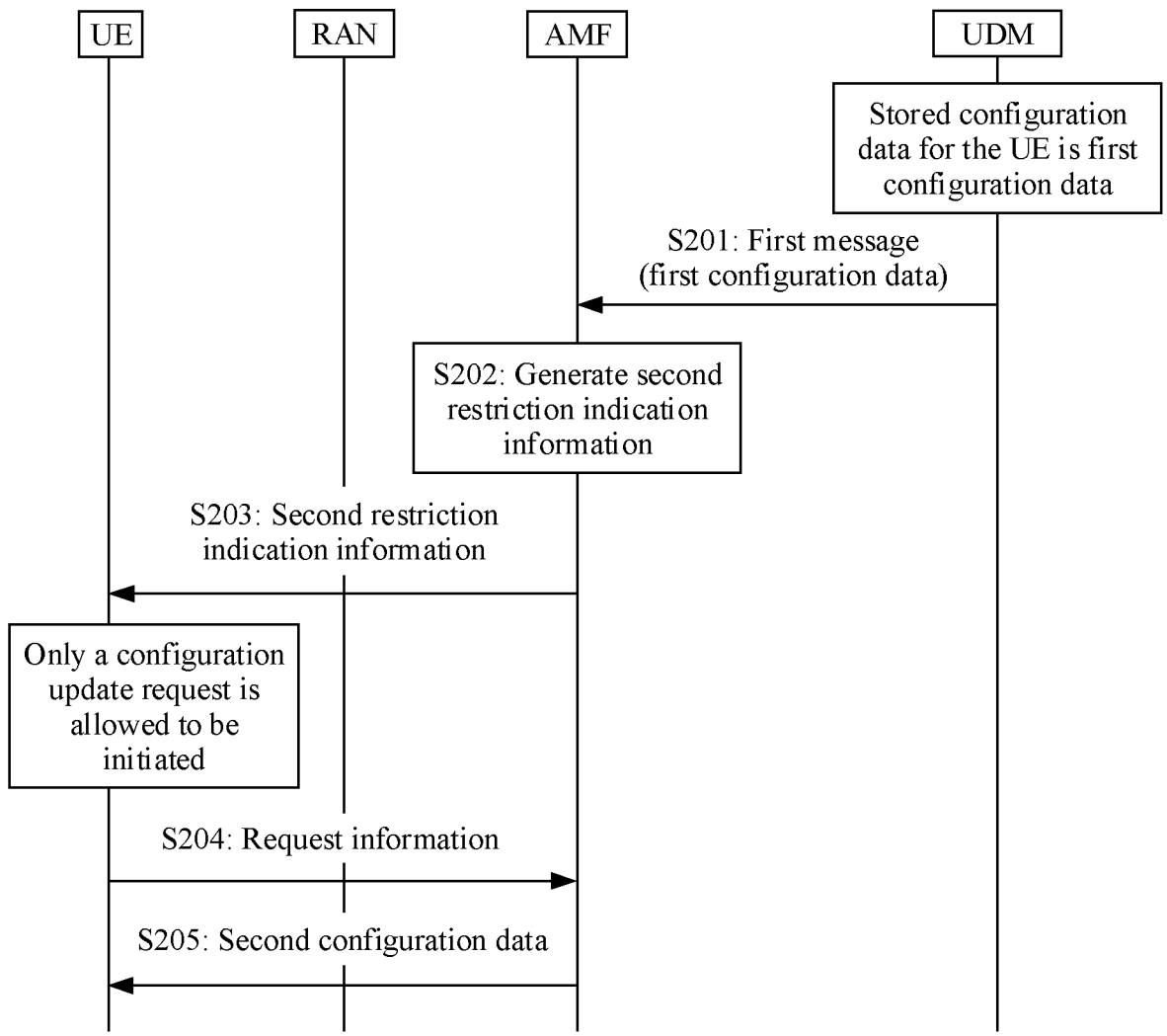
FIG. 2 is a schematic flowchart of a configuration data update method according to this application.

FIG. 2 is a schematic flowchart of a configuration data update method.

S201: A UDM sends a first message to an AMF. When configuration data for UE in the UDM is updated to that there is no accessible CAG cell, that is, when a CAG list, included in the configuration data, that the UE is allowed to access is empty, and the configuration data includes a first restriction indication, the UDM sends the first message to the AMF. The first restriction indication is used to configure a state of the UE to be CAG only (empty state), that is, used to indicate the UE to access a network through a CAG. The first message may be an Nudm_SDM_Notification message, and is used to notify the AMF that the configuration data of the UE is updated. It should be noted that, in this case, the CAG list that the UE is allowed to access, that is, the empty CAG list, is not configured for the UE, and a current configuration of the UE still stores an old CAG list, where the old CAG list may not be empty.

The UDM sends updated configuration data, that is, first configuration data, to the AMF. Optionally, the UDM uses the first message to carry the first configuration data, that is, carry the allowed CAG list. In this case, the CAG list is empty, that is, there is no available CAG ID.

In addition, optionally, the UDM sends second restriction indication information. The second restriction indication information may also be included in the first message. After being sent to the AMF, the second restriction indication information may be sent by the AMF to the UE, to indicate that the UE may access the network through a CAG cell that is not in the CAG list, any cell, or a default cell but is only allowed to update configuration data, the UE is not allowed to request a user plane data service request, and the UE is not allowed to request a service irrelevant to configuration data update in control plane services. The UDM may alternatively include the second restriction indication information in the first configuration data of the UE, or send the second restriction indication information to the UE in another form. Based on the second restriction indication information, the UE that is in the CAG only state and whose CAG list is empty no longer actively initiates a user plane service. The UE is configured using the second restriction indication information, such that the UE no longer actively initiates the user plane service, and can initiate configuration data update only through the network. This simplifies processing performed by a network side apparatus on request information sent by the UE, and reduces a risk that network security is reduced because the network side apparatus incorrectly checks the request information sent by the UE.

In addition, in another implementation, the second restriction indication information is used to indicate the AMF network element to cancel mobility restriction check on the UE. Alternatively, the second restriction indication information has both the foregoing two indication functions.

S202: The AMF receives the first message, where the first message may include the first configuration data.

In an implementation, when the AMF determines that the CAG list in the first configuration data is empty and the first configuration data includes the first restriction indication, that is, the AMF may check whether the configuration data for the UE on a network side is currently updated to that there is no accessible CAG cell (that is, the CAG list is empty) and the UE is set to be CAG only (empty state), and if yes, the AMF no longer performs mobility restriction check on the UE. Optionally, the AMF generates the second restriction indication information, or may report the second restriction indication information to the UDM to synchronize a related restriction state. It should be noted that the AMF stores the CAG list that the UE is allowed to access, and the AMF receives an N2 message sent by a base station. A mobility restriction is as follows: The N2 message includes information about a CAG cell accessed by the UE. The cell information may be carried in a NAS container or a specific information element in the N2 message. If the CAG cell currently accessed by the UE is not in the allowed CAG list, the AMF rejects a current access request of the UE based on the mobility restriction. If the mobility restriction check is canceled, the AMF receives the access request of the UE.

In another implementation, when the UDM has sent the second restriction indication information to the AMF in step S201, the AMF may not need to determine whether the CAG list is empty. Based on the second restriction indication information, the AMF no longer performs mobility restriction check on the UE.

S203: Optionally, the AMF may send the first configuration data to the UE. The first configuration data may alternatively not include the CAG only indication. In addition, when the UDM does not include the second restriction indication information in the first configuration data of the UE in step 201, the AMF may generate and send the second restriction indication information to the UE, that is, the second restriction indication information sent by the AMF to the UE may be received from the UDM, or may be generated by the AMF based on the empty CAG list and the first restriction indication. The second restriction indication information is used to indicate that the UE is allowed to access the network to perform only configuration data update, the UE is not allowed to request the user plane data service request, and the UE is not allowed to request the service irrelevant to configuration data update in the control plane services. The AMF may write the second restriction indication information into a context of the UE, such that based on the second restriction indication information, the UE is enabled to be in a state in which the UE is not restricted to accessing the network through the CAG cell in the allowed CAG list. The AMF may send the first configuration data to the UE by initiating a configuration update procedure.

S204: Optionally, the UE sends request information to the AMF, where the request information is used to request to update the configuration data. After the UE receives the second restriction indication information, and optionally, receives the first configuration data, the UE may keep in a registered state but does not actively initiate a user plane service request or another control plane service request irrelevant to the configuration data, and the UE is allowed to initiate configuration update to the network side through the CAG cell that is not in the CAG list, any cell, or the default cell.

The UE may keep in the registered state, periodically initiate the service request, and query for whether the configuration data for the UE on the network side is updated. When the configuration data for the UE on the network side is updated, for example, updated to second configuration data, the AMF allows the service request initiated by the UE, such that the UE enters a connected state and completes configuration update. In the second configuration data, the UE is no longer restricted to being CAG only, and/or the allowed CAG list is not empty.

In another implementation, the UE may keep in the registered state, but does not actively perform configuration update query. When configuration update occurs on the AMF, the UE is enabled to enter the connected state and complete configuration update in a paging process initiated by the network side.

S205: When the configuration data for the UE is updated to the second configuration data, the AMF sends the second configuration data to the UE.

When the AMF is in a state in which the AMF no longer performs mobility restriction check on the UE, the AMF allows the UE to access the network through the CAG cell that is not in the CAG list, any cell, or the default cell. Because the UE has received the second restriction indication information sent by the AMF, the UE no longer requests the user plane service or the service irrelevant to configuration update, for example, a positioning service request or small data transmission. Optionally, the AMF restricts behavior of the UE, and only allows the UE to perform registration and configuration update. However, if the UE requests the user plane service, for example, requests to establish a session, the AMF rejects the request. When the UE requests the control plane service, and requests the service irrelevant to configuration update, for example, the positioning service request and the small data transmission, the AMF rejects the request, to further ensure access restriction on the UE. The AMF can restrict the behavior of the UE by modifying the context of the UE to only allow the UE to perform registration and configuration data update.

After the request message sent by the UE is received, if configuration data for the UE in the AMF is updated to the second configuration data, the AMF sends the second configuration data to the UE.

In another possible implementation, when an allowed CAG list in the configuration data for the UE in the AMF becomes empty and the CAG only indication is set, the AMF does not update CAG information on the UE and the base station. When the UE initiates the service request or a registration request, the AMF uses a specific cause value to reject a NAS request. The cause value is different from a cause value for the UE to delete the CAG ID. To restrict the behavior of the UE, the AMF sets all or some service areas as non-allowed areas, and the AMF only allows the UE to perform configuration update. UE in the non-allowed area is not allowed to initiate a service request and session management signaling to obtain a UE service. When the configuration information on the network side is updated, that is, the configuration information is not "CAG only and an allowed CAG cell being empty", the AMF moves all or some service areas of the UE out of the non-allowed areas.

In this embodiment, the AMF configures the UE, such that the UE can still initiate configuration update. In addition, the AMF cancels mobility restriction check for the request of the UE, and allows the UE to access the network to perform configuration update.

In addition, when the CAG list of the UE is updated to be not empty, the UE is no longer restricted to performing only configuration update and the UE restores its normal capability in a range of an allowed CAG cell, and the AMF also restores mobility restriction check on the UE.

Figure 3:
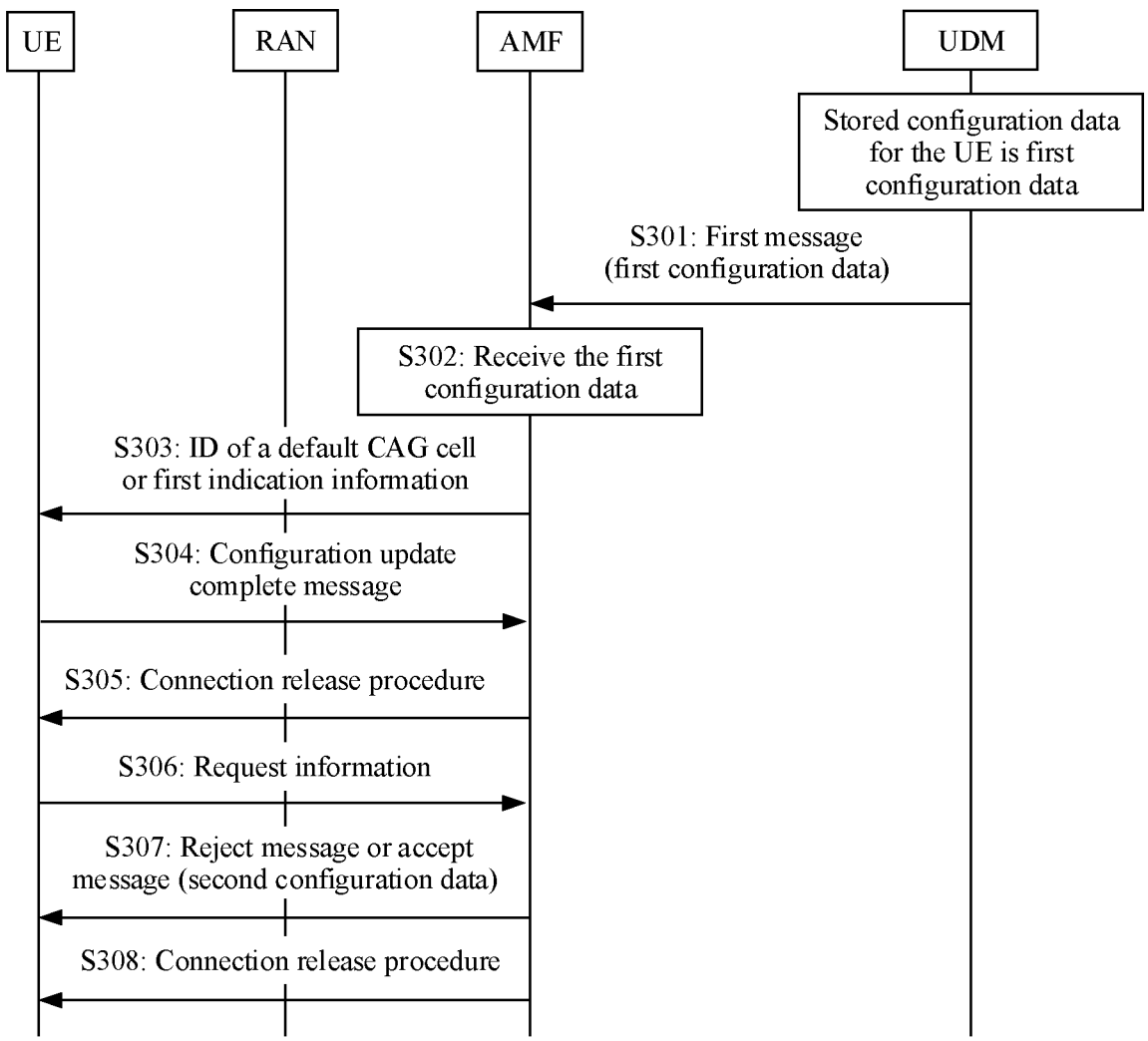
FIG. 3 is a schematic flowchart of another configuration data update method according to this application.

FIG. 3 is a schematic flowchart according to another embodiment of this application. For descriptions of related steps and terms in the embodiment shown in FIG. 3, refer to FIG. 2 and corresponding parts in another embodiment. The method shown in FIG. 3 includes the following steps.

S301: A UDM sends a first message to an AMF, where the first message may be a Nudm_SDM_Notification message, and is used to notify the AMF that configuration data of UE is updated. The UDM sends updated first configuration data including an empty CAG list to the AMF. Optionally, an allowed CAG list may be carried in the first message. In this case, the CAG list is empty, that is, there is no available CAG ID. It should be noted that, in this case, the CAG list that the UE is allowed to access, that is, the empty CAG list, is not configured for the UE, and a current configuration status of the UE is still an old CAG list. For a related step of S301, refer to the descriptions of S201.

S302: The AMF receives the first message and the allowed CAG list. After receiving the allowed CAG list sent by the UDM, the AMF updates a previously stored CAG list of the UE. Because the CAG list is empty, the AMF deletes a CAG ID from the previously stored CAG list.

In addition, optionally, the AMF sends the received first configuration data that includes the empty CAG list to the UE.

S303: The AMF configures the UE, such that the UE is in a state in which the UE is allowed to access a network not only through a CAG in the list.

In an implementation, the AMF sends an ID of a default CAG cell to the UE. Through sending of the ID of the default CAG cell, the UE is restricted to accessing the network only through the default CAG cell. Through receiving of the default CAG cell, the UE is configured to be in a non-empty state in which the UE is allowed to access the network not only through the CAG in the list. The AMF may send the ID of the default CAG cell from a network side to a UE side through a configuration update procedure, and uses the default CAG cell as the allowed CAG list. The UE can still be in a CAG only state. In addition, optionally, it may be configured that the UE is allowed to access the default CAG cell to perform only configuration data update.

In another implementation, the AMF sends first indication information to indicate that the UE is no longer in the CAG only state. To be more specific, the UE is configured, using the first indication information, to be in the non-empty state in which the UE is allowed to access the network not only through the CAG in the list. Based on the first indication information, the UE is no longer in the CAG only state, and may initiate an access request through a non-allowed CAG cell or another public cell in a PLMN network. The first indication information may be sent to the UE by replacing a first restriction indication (CAG only indication) in the first configuration data, and being included in the first configuration data.

S304: Through receiving of the default CAG ID or the first indication information, the UE is configured to be in the state in which the UE is allowed to access the network not only through the CAG in the CAG list. The UE may reply to the AMF with a configuration update complete message.

After the UE receives the default CAG ID, optionally, if an available CAG list received by the UE is empty, the UE may still use a cell corresponding to the default CAG ID to access the network, and perform configuration update.

S305: Optionally, after receiving the configuration update complete message sent by the UE, the AMF may initiate a radio resource control (RRC) connection release or deregistration procedure, to change a current state of the UE from a connected state to an idle state or a deregistered state, such that the UE cannot use another network service, and a network service resource occupied by the UE is released.

S306: The UE initiates a registration request or a service request to the AMF. When configuration update needs to be performed, in an implementation, the UE initiates request information to determine whether configuration data on the network side changes, where the request information may be registration request information or service request information, the registration request information is used to request to register with the network, and the service request information is used to request a service. The UE may periodically send the registration request information or the service request information.

In an implementation, when the UE receives an ID of at least one default CAG cell, the UE may send the request information through the special CAG cell.

In another implementation, if the UE receives the first indication information, the UE may send the registration request or the service request through the non-allowed CAG cell or the other public cell in the PLMN network.

S307: The AMF sends the updated CAG list to the UE using a registration request accept message or a service request accept message.

The AMF first obtains latest configuration data for the UE that includes the CAG list, and synchronizes the configuration data of the UE between the AMF and the UDM, such that the AMF obtains the updated latest CAG list. The AMF may actively send information to the UDM to request the updated CAG list, or the UDM may actively synchronize and send the updated configuration data such as the updated CAG list to the AMF. The UDM sends the allowed CAG list including an allowed CAG ID to the AMF. When configuration information of the UE remains unchanged, the AMF performs mobility restriction to reject the registration request or service request of the UE. In addition, the UDM may further send an indication to the AMF, to indicate that the CAG list in the configuration data is not empty; or the UDM does not send the indication, and the AMF determines that the CAG list is not empty based on the received CAG list.

When the configuration data of the UE in the AMF or the UDM changes from "CAG only and the allowed CAG list is empty" to "CAG only and the allowed CAG list is not empty", or when the CAG only restriction is canceled, that is, when the configuration data of the UE is updated to second configuration data, in an implementation, the AMF accepts the registration request or the service request. However, in some cases, for example, because security contexts are inconsistent or an identity credential is an SUCI, primary authentication is triggered, and the AMF receives the registration request or the service request and sends the second configuration data to the UE. Optionally, the second configuration data may also be included in the registration request accept message or the service request accept message replied to the UE, and integrity protection needs to be performed on the message. When no NAS security context is available on the AMF, the AMF first negotiates a NAS security context with the UE through a NAS SMC procedure, and then replies to the UE with the registration request accept message or the service request accept message on which confidentiality and integrity protection are performed.

In addition, when the configuration data of the UE changes from "CAG only and the allowed CAG list being empty" to "CAG only and the allowed CAG list being not empty", or the CAG only restriction is canceled, the AMF accepts the registration request or the service request. In addition, the AMF may be configured to only allow the UE to subsequently request configuration data update, to prevent the UE from initiating another service request before completing configuration data update. The AMF may carry the updated CAG list in the request accept message, or send the CAG list or a CAG only restriction cancellation indication to the UE through the configuration update procedure. Confidentiality and integrity protection need to be performed on a message that carries the CAG list or the CAG only restriction cancellation indication. When no NAS security context is available on the AMF, the AMF first negotiates a NAS security context with the UE through a NAS security mode command (SMC) procedure, and then replies to the UE with the integrity-protected message.

When the configuration data for the UE is updated to the second configuration data, in another implementation, the AMF sends reject information to the UE, to reject the registration request or the service request. The reject message carries the second configuration data. The AMF may further send a cause value, where the cause value is used to indicate the UE to update a CAG list. Integrity protection needs to be performed on a message that carries the CAG list, the CAG only restriction cancellation indication, or the cause value. When there is an available NAS security context on the AMF, the AMF directly uses the security context to perform integrity protection on the message. When no NAS security context is available on the AMF, the AMF negotiates a NAS security context with the UE through a NAS SMC procedure, and then replies to the UE with the integrity-protected reject message.

The reject message or accept message carries a new allowed CAG list or the CAG only restriction cancellation indication, such that a configuration update procedure does not need to be initiated again to update the CAG list to the UE, and therefore system signaling is reduced.

S308: When the AMF receives the configuration update complete message sent by the UE, optionally, the AMF initiates the RRC connection release procedure or the deregistration procedure, such that the UE releases the network resource. When the UE needs to access the network again, the UE needs to select a CAG cell based on the updated configuration information. A base station and the AMF perform mobility check based on the updated configuration information.

In addition, for configuration update, in addition to that the UE actively initiates the registration request or the service request message in S307, in another implementation, when the UE is in the idle state, and the configuration data on the AMF is updated to the second configuration data, the AMF actively pages the UE to update the configuration data on the UE.

In the solution of this embodiment, the UE is configured, for example, the ID of the default or special CAG cell is allocated, such that the UE can perform configuration data update with the network side through the default CAG cell. Alternatively, the CAG only state of the UE is cancelled, such that the UE can access the network through the non-CAG cell to perform configuration update. It should be noted that, the default CAG cell is not included in the CAG list, and may also be used as a default configured CAG cell and used as a part of a CAG list stored by the UE.

Figure 4:
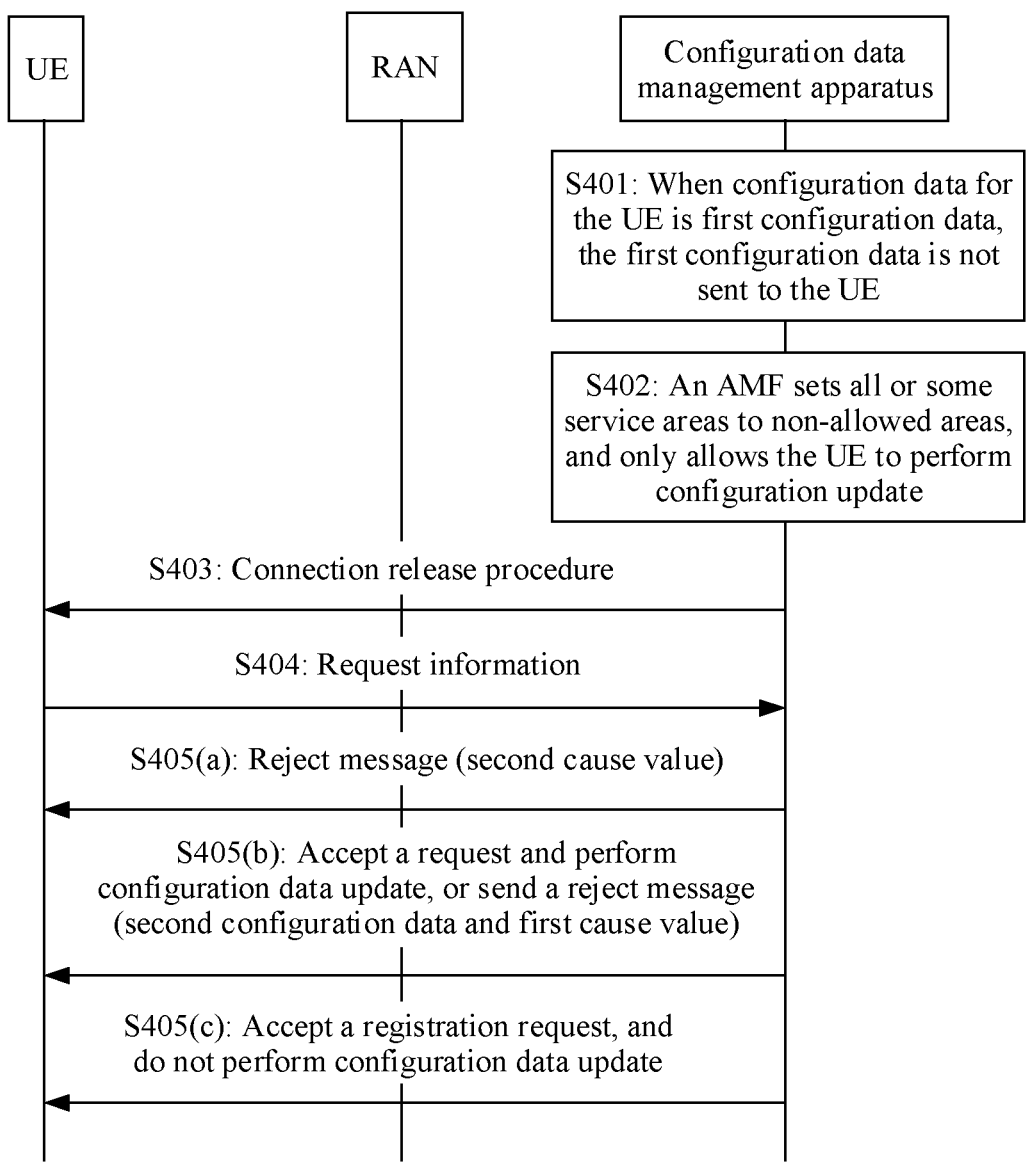
FIG. 4 is a schematic flowchart of another configuration data update method according to this application.

FIG. 4 is a schematic flowchart of another configuration data update method. For descriptions of related steps and terms in the embodiment shown in FIG. 4, refer to corresponding parts in the embodiments shown in FIG. 2, FIG. 3, and another accompanying drawing. The method shown in FIG. 4 includes the following steps.

S401: A configuration data management apparatus confirms that when configuration data of UE changes from "CAG only and an allowed CAG list being not empty", "an allowed CAG list being empty and no CAG only restriction", or "an allowed CAG list being not empty and no CAG only restriction" to first configuration data indicating "CAG only and an allowed CAG list being empty", the first configuration data that is "CAG only and the allowed CAG list being empty" is not sent to the UE.

When the configuration data management apparatus is an AMF, the AMF updates the configuration data of the UE from a UDM. When the configuration data of the UE changes from "a CAG only restriction indication and the allowed CAG list being not empty", "the allowed CAG list being empty and no CAG only restriction indication", or "the allowed CAG list being not empty and no CAG only restriction indication" to the first configuration data, the first configuration data includes a first restriction indication and an empty CAG list. The first restriction indication may be a CAG only restriction indication, used to indicate the UE to access a network through a CAG. Optionally, the AMF deletes an old CAG ID in configuration data stored by the UE and/or adds the CAG only restriction indication.

S402: When the configuration data management apparatus is the AMF, the AMF configures the UE to be in a state in which the UE is allowed to access the network not only through a CAG in the CAG list.

In an implementation, the AMF does not send the updated first configuration data in which the CAG list is empty to the UE, such that a CAG list that is not empty and stored in the UE is not replaced with the empty CAG list in the first configuration data. In this way, the UE is in a state in which the UE is allowed to access the network not only through the empty CAG list in the first configuration data. Optionally, to restrict behavior of the UE, the AMF sets all or some service areas to non-allowed areas, and the AMF only allows the UE to perform configuration update. UE in a non-allowed area is not allowed to initiate a service request and session management signaling to obtain a UE service. When configuration information on a network side is updated, that is, the configuration data is not "the CAG only restriction indication and the allowed CAG cell being empty", the AMF moves all or some service areas of the UE out of the non-allowed areas.

In another implementation, the AMF removes the first restriction indication from the first configuration data, and the AMF sends, to the UE, the first configuration data from which the first restriction indication is removed, where the first configuration data from which the first restriction indication is removed is used to configure that the terminal apparatus is allowed to access the network not only through the CAG, that is, enable the UE to be in a non-CAG only state. The AMF may replace the first restriction indication with a non-CAG only indication, include the non-CAG only indication in the configuration data, and send the configuration data together with the empty CAG list to the UE.

In another implementation, the AMF sends first indication information to the terminal apparatus, where the first indication information is used to indicate that the terminal apparatus is allowed to access the network not only through the CAG.

When the configuration data management apparatus is the UDM, the UDM does not perform a UE configuration update procedure. The UDM adds a subscription permanent identifier (SUPI) corresponding to the UE to a forbidden list, and does not allow the UE to register with the network.

S403: Optionally, when the configuration data for the UE is the first configuration data, the configuration data management apparatus triggers an RRC connection release or deregistration procedure, to release a network service resource occupied by the UE.

S404: The UE sends a request message, where the request message may be a registration request or a service request. When the UE receives the complete first configuration data, current configuration data of the UE is still old configuration data, that is, "CAG only and an allowed CAG list being an old CAG ID", "an allowed CAG list being empty and no CAG only restriction", or "an allowed CAG list being an old CAG ID and no CAG only restriction". Alternatively, when the UE receives the configuration data from which the first restriction indication is removed or the first indication information, the UE is enabled to be in the non-CAG only state. However, configuration data in the configuration data management apparatus, for example, the AMF or the UDM includes: "CAG only and an allowed CAG list being empty". In this case, the UE still stores an available CAG ID or is in the non-CAG only state. The UE periodically or randomly sends the access registration request or the service request through an available CAG cell, or the UE periodically or randomly sends the access registration request or the service request through a non-CAG cell.

Optionally, S405 (a): After receiving the request message sent by the UE, when the configuration data stored by the configuration data management apparatus is not updated, that is, is still "CAG only and the allowed CAG list is empty", and the configuration data management apparatus is the AMF, the AMF performs mobility restriction check, sends a reject message including a second cause value to the UE to reject the request of the UE, where the second cause value is used to indicate the UE not to delete the CAG list stored in the UE. In addition, the AMF needs to keep configuration data synchronized with the UDM. The UDM may send latest configuration data of the UE that is stored in the UDM to the AMF actively or after being requested by the AMF. If the configuration data management apparatus is the UDM, because the SUPI of the UE is still in the forbidden list of the UDM, even if the UDM does not send configuration data in which the CAG list is empty to the AMF in the previous step and the mobility check performed by the AMF succeeds, the UE cannot succeed in registration.

Optionally, S405 (b): When the configuration data stored in the configuration data management apparatus is updated, that is, the configuration information of the UE changes from "CAG only and the allowed CAG list being empty" to second configuration data that is "non-CAG only or the allowed CAG list being not empty, the AMF receives a registration request or a service request from the UE. When the SUPI corresponding to the UE is in the forbidden list of the UDM, the UDM removes the SUPI corresponding to the UE from the forbidden list, to complete a normal registration procedure. The AMF sends updated configuration information to the UE using a registration request accept message or a service request accept message. For a step, refer to S307. Details are not described herein again.

Alternatively, the AMF sends reject information to the UE, to reject the registration request or the service request. When NAS security of the terminal apparatus is available, the reject message carries the second configuration data. The AMF may further send a first cause value, where the first cause value is used to indicate the UE to update the CAG list.

The reject message or accept message carries a new allowed CAG list, such that a configuration update procedure does not need to be initiated again to update the CAG list to the UE, and therefore system signaling is reduced.

Optionally, S405 (c): When the updated configuration data is the same as the configuration data currently stored by the UE, in other words, when the CAG list in the updated configuration data is the same as the CAG list currently stored by the UE (that is, an old CAG list stored by the configuration data update apparatus), the configuration data management apparatus may receive the request message sent by the UE, and does not need to send the updated configuration data to the UE.

Figure 5:
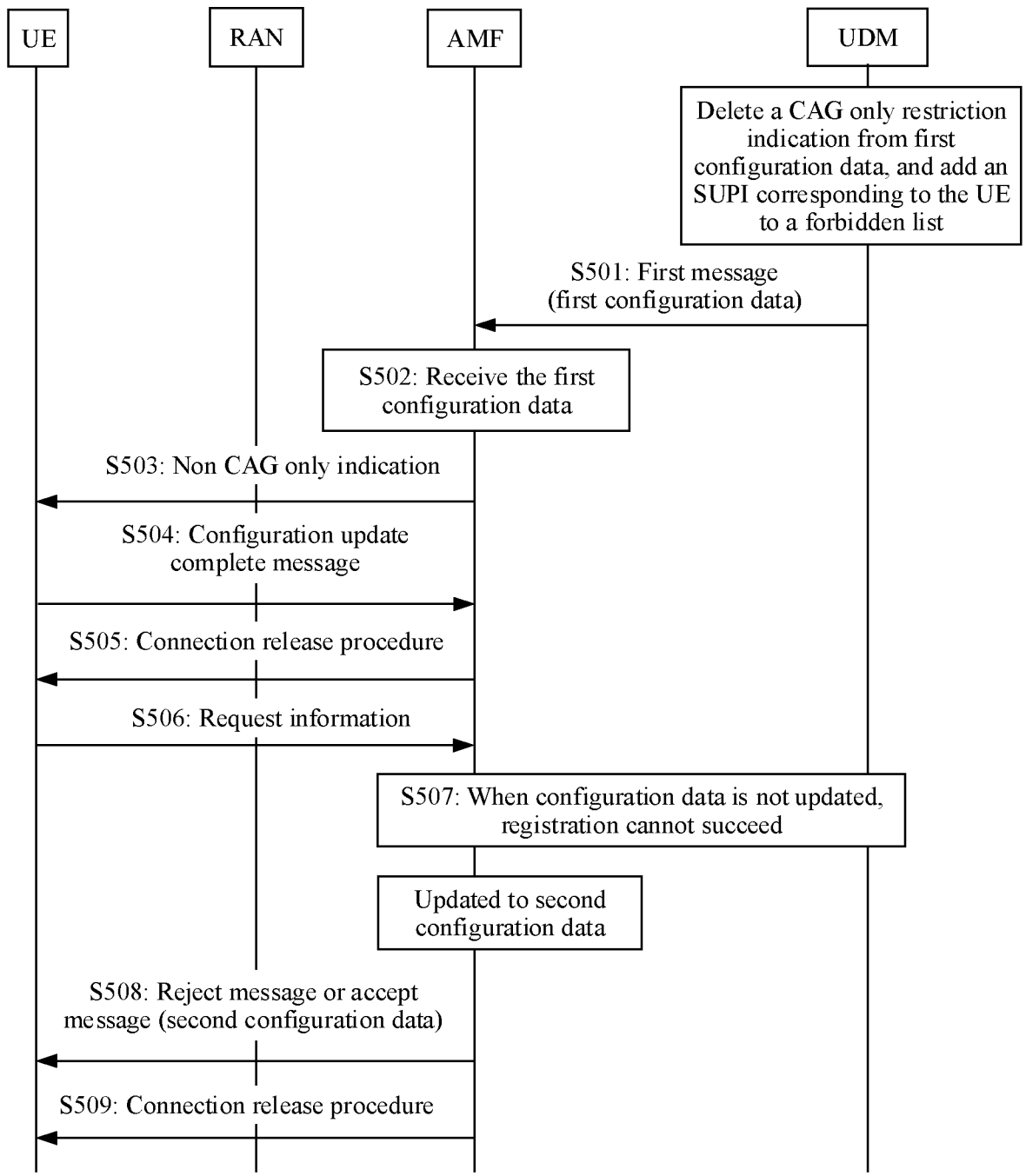
FIG. 5 is a schematic flowchart of another configuration data update method according to this application.

FIG. 5 is a schematic flowchart according to another embodiment of this application. For descriptions of related steps and terms in the embodiment shown in FIG. 5, refer to corresponding parts in the embodiments shown in FIG. 2 to FIG. 4. The method shown in FIG. 5 includes the following steps.

S501: A UDM sends a first message to an AMF, where the first message may be a Nudm_SDM_Notification message, and is used to notify the AMF that configuration data of UE is updated. The UDM sends updated configuration data, that is, an empty CAG list, to the AMF. Optionally, an allowed CAG list and a CAG only indication may be carried in the first message. In this case, the CAG list is empty, that is, there is no available CAG ID. It should be noted that, in this case, the CAG list that the UE is allowed to access, that is, the empty CAG list, and the CAG only indication are not configured for the UE, and a current configuration status of the UE is still an old CAG list or no_CAG_only.

When configuration information of the UE in the UDM changes from "CAG only and an allowed CAG list being not empty", "an allowed CAG list being empty and no CAG only restriction", or "an allowed CAG list being not empty and no CAG only restriction" to first configuration data that is "CAG only and the allowed CAG list being empty", the UDM adds an SUPI corresponding to the UE to a forbidden list, and does not allow the UE to register with a network. Alternatively, the first message may carry a deregistration indication, where the deregistration indication is used to indicate the AMF to perform a deregistration procedure after completing a configuration update procedure of the UE, to release a network resource of the UE. In addition, in the configuration information that is of the UE and that is sent by the UDM to the AMF, the CAG only restriction indication of the UE is changed to a non-CAG only indication, such that the UE can no longer be restricted to accessing the network only through a CAG cell.

S502: The AMF receives the first message, where the first message may include the allowed CAG list and the non-CAG only indication. After receiving the allowed CAG list sent by the UDM, the AMF updates a previously stored CAG list of the UE. Because the CAG list is empty, the AMF deletes a CAG ID from the previously stored CAG list. In addition, the AMF may send the received empty CAG list to the UE.

S503: The AMF configures the UE, such that the UE is in a state in which the UE is allowed to access the network not only through a CAG in the list.

The AMF sends the non-CAG only indication. The UE is configured, using the indication information, to be in a non-empty state in which the UE is allowed to access the network not only through the CAG in the list. Based on the non-CAG only indication, the UE is no longer in a CAG only state, and may initiate an access request to a non-CAG cell.

S504: The UE receives the non-CAG only indication, and the empty CAG list. The UE is configured to be in the non-empty state in which the UE is allowed to access the network not only through the CAG in the list, and the UE may reply to the AMF with a configuration update complete message.

S505: Optionally, after receiving the configuration update complete message sent by the UE, the AMF may initiate a radio resource control (RRC) connection release or deregistration procedure, to change a current state of the UE from a connected state to an idle state or a deregistered state, such that the UE cannot use another network service, and a network service resource occupied by the UE is released.

S506: The UE initiates a registration request or a service request to the AMF. When configuration update needs to be performed, in an implementation, the UE initiates registration request information or service request information, to determine whether configuration data on a network side changes, where the registration request information is used to request to register with the network, and the service request information is used to request a service. The UE may periodically send the registration request information or the service request information.

The UE may send the registration request or the service request through the non-CAG cell.

S507: If the SUPI corresponding to the UE is in the forbidden list of the UDM, and configuration information of the UE stored in the UDM is still "CAG only and the allowed CAG list being empty", it may be considered that the configuration data is not updated. Because in this case, the SUPI corresponding to the UE is still in the forbidden list of the UDM, the UE cannot successfully perform registration through the AMF. When the configuration information of the UE changes from "CAG only and the allowed CAG list being empty" to "non-CAG only or the allowed CAG list being not empty", the corresponding SUPI is removed from the forbidden list, such that the UE can perform a normal registration procedure.

S508: The AMF sends the updated CAG list to the UE using a registration request accept message or a service request accept message.

The AMF first obtains latest CAG list, and synchronizes subscription data of the UE between the AMF and the UDM, such that the AMF obtains new configuration information or subscription data including the updated latest CAG list. The AMF may send information to the UDM to actively request the updated CAG list, or the UDM may actively synchronize and send updated configuration data such as the updated CAG list to the AMF. The UDM sends the allowed CAG list including an allowed CAG ID to the AMF. When the configuration information of the UE remains unchanged, the SUPI corresponding to the UE is still in the forbidden list of the UDM. Therefore, the UE cannot successfully perform registration through the AMF, and the registration request or the service request of the UE is rejected. In addition, the UDM may further send an indication to the AMF, to indicate that a CAG list in the configuration data is not empty; or the UDM does not send the indication, and the AMF determines that the CAG list is not empty based on the received CAG list.

When the configuration data of the UE changes from "CAG only and the allowed CAG list being empty" to "CAG only and the allowed CAG list being not empty", the SUPI corresponding to the UE is removed from the forbidden list of the UDM, such that the UE can perform the normal registration procedure, and the AMF accepts the registration request or the service request. However, in some cases, for example, because security contexts are inconsistent, or an identity credential is an SUCI, primary authentication is triggered, and the AMF receives the registration request or the service request and sends new subscription data to the UE, where the new subscription data includes the updated CAG list. Optionally, the subscription data may also be included in the registration request accept message or the service request accept message replied to the UE.

In addition, when the configuration data of the UE changes from "CAG only and the allowed CAG list being empty to "CAG only and the allowed CAG list being not empty", the AMF and the UDM accept the registration request or the service request. In addition, the AMF may be configured to only allow the UE to subsequently request configuration data update, to prevent the UE from initiating another service request before completing configuration data update. The AMF may carry the updated CAG list in the request accept message, or send the CAG list to the UE through the configuration update procedure.

In another implementation, when the configuration data of the UE changes from "CAG only and the allowed CAG list being empty" to "CAG only and the allowed CAG list being not empty". In an implementation, the AMF sends reject information to the UE, to reject the registration request or the service request. The reject message carries a new allowed CAG list. The AMF may further send a cause value, where the cause value is used to indicate the UE to update the CAG list.

The reject message or accept message carries the new allowed CAG list, such that a configuration update procedure does not need to be initiated again to update the CAG list to the UE, and therefore system signaling is reduced.

S509: When the UE receives the configuration update complete message sent by the AMF, optionally, the AMF initiates the RRC connection release procedure or the deregistration procedure, such that the UE releases the network resource.

In addition, for configuration update, in addition to that the UE actively initiates the registration request or the service request message in S307, in another implementation, when the UE is in the idle state, and configuration information on the AMF changes from "CAG only and the allowed CAG list being empty" to "CAG only and the allowed CAG list being not empty", the AMF actively pages the UE to update the configuration data on the UE.

In the solution of this embodiment, the CAG only state of the UE is canceled by configuring the UE, such that the UE can access the network through the non-CAG cell to perform configuration update. In addition, the UDM adds the SUPI of the UE to the forbidden list, such that the UE cannot normally access the network through the non-CAG, and can be used only for configuration update. Embodiments of this application further provide an apparatus configured to implement any one of the foregoing methods. For example, embodiments of this application provide an apparatus including a unit (or means) configured to implement the steps performed by the terminal apparatus in any one of the foregoing methods. For another example, embodiments of this application further provide another apparatus, including a unit (or means) configured to implement the steps performed by the session management network element in any one of the foregoing methods.

This application further provides another embodiment. For related steps and term descriptions in this embodiment, refer to corresponding parts in the embodiments shown in FIG. 2 to FIG. 5. The method in this embodiment may also be applied not only to a scenario in which the UE is configured as CAG only and the allowed CAG list is empty through network configuration, but also to a scenario in which the UE is configured as CAG only in an initial state, for example, before delivery and the allowed CAG list is empty. That is, the first configuration data has been configured on the UE. The method may be further applied to a scenario in which the UE is CAG only and the allowed CAG list is not empty, but there is no available CAG cell.

Optionally, S1001 (*a*): An AMF sends second indication information to the UE, where the second indication information is used to indicate the UE to initiate an access request through a non-allowed CAG cell or another public cell in a PLMN network when the UE is in an empty state or there is no accessible CAG cell.

Optionally, S1001 (*b*): In another implementation, an AMF sends third indication information to the UE, to indicate the UE to initiate an access request through a specific CAG cell after receiving fourth indication information when the UE is in an empty state or there is no accessible CAG cell. The fourth indication information indicates that the UE may connect to a network through the specific CAG cell. The fourth indication information may be sent to the UE together with an identifier of the specific CAG cell through broadcast, or may be sent separately. When the UE is in the empty state or there is no accessible CAG cell, the UE may attempt to access the network through the CAG cell, to obtain updated configuration data.

Optionally, S1002: The UE receives information about the specific CAG cell and the fourth indication information that are broadcast by a base station. The fourth indication information indicates that the UE may connect to the network through the specific CAG cell.

It should be noted that both S1001 (*a*) and S1001 (*b*) are unnecessary steps. Even if the third indication information in S1001 (*b*) is not sent to the UE, the fourth indication information and the information about the specific CAG cell in S1002 may still be sent.

The fourth indication information indicates that the UE may connect to the network through the specific CAG cell, such that when the UE is in the empty state or there is no accessible CAG cell, the UE may access the network through the CAG cell, to obtain updated configuration data.

The information about the specific CAG cell includes a CAG ID. The information about the specific CAG cell may indicate the specific CAG cell using the CAG ID. A relationship between the CAG ID and the base station cell is that a physical cell may include one or more logical cells, one logical cell may serve one or more PLMNs, the broadcast includes one or more PLMN IDs, and one PLMN ID may include one or more CAG cells, that is, the broadcast further includes one or more CAG IDs. A combination of a PLMN ID and a CAG ID can uniquely identify a CAG cell. For example, a first physical cell may include a first logical cell and a second logical cell. The first logical cell may broadcast a first PLMN ID and a second PLMN ID, and the second logical cell may broadcast a third PLMN ID. When broadcasting the first PLMN ID, the base station separately broadcasts a first CAG ID, a second CAG ID, and a third CAG ID. When broadcasting the second PLMN ID, the base station separately broadcasts a fourth CAG ID and a fifth CAG ID. When broadcasting the third PLMN ID, the base station broadcasts a sixth CAG ID.

A correspondence between the fourth indication information and the CAG cell may be one of the following granularities:

One piece of fourth indication information corresponds to all CAG cells in one physical cell, that is, the fourth indication information is of a physical cell granularity. For example, the fourth indication information indicates that all CAG cells in the first physical cell can be connected by the UE to perform configuration update. It may be understood that the fourth indication information is bound to the first CAG ID to the sixth CAG ID.

One piece of fourth indication information may alternatively correspond to all CAG cells in one logical cell, that is, the fourth indication information is of a logical cell granularity. For example, the fourth indication information indicates that all CAG cells in the first logical cell of the first physical cell can be connected by the UE to perform configuration update. It may be understood that the fourth indication information is bound to the first CAG ID to the fifth CAG ID. The sixth CAG ID is not bound to the fourth indication information. When the UE allows that there is no sixth CAG ID in the CAG list and there is no other available cell, the UE does not connect to the network, nor initiate a registration request or a service request.

One piece of fourth indication information may alternatively correspond to all CAG cells in one logical cell, that is, the fourth indication information is of a PLMN ID granularity. For example, the fourth indication information indicates that all CAG cells in the first logical cell of the first physical cell can be connected by the UE to perform configuration update. It may be understood that the fourth indication information is bound to the first CAG ID to the third CAG ID. The fourth CAG ID to the sixth CAG ID are not bound to the fourth indication information. When the UE allows that there is no fourth, fifth, or sixth CAG ID in the CAG list and there is no other available cell, the UE does not connect to the network, nor initiate a registration request or a service request.

One piece of fourth indication information may alternatively correspond to one CAG cell, that is, the fourth indication information is of a CAG ID granularity. For example, the fourth indication information indicates that the first CAG ID under the first PLMN ID in the first logical cell of the first physical cell can be connected to the UE to perform configuration update. It may be understood that the fourth indication information is bound to the first CAG ID. The second CAG ID to the sixth CAG ID are not bound to the fourth indication information. When the UE allows that there is no second, third, fourth, fifth, or sixth CAG ID in the CAG list and there is no other available cell, the UE does not connect to the network, nor initiate a registration request or a service request.

The fourth indication information and the associated specific CAG cell may be sent to the UE together, or may be separately sent.

S1003: The UE selects a CAG cell and connects to the network through the selected CAG cell.

If the UE receives the second indication information, the UE selects any CAG cell or a public network cell, or a CAG cell or a public cell in a locally configured allowed CAG list for network connection. Optionally, the UE preferentially selects the CAG cell or the public network cell in the locally configured information for access. If the second indication information is not received, the UE selects, based on a locally configured policy, a CAG in the locally configured allowed CAG list for network connection.

If the UE receives the fourth indication information and the information about the specific CAG cell, the UE may send a registration request or a service request by connecting to the specific CAG cell. Optionally, the UE preferentially selects the CAG cell or the public network cell in the locally configured information for access. When broadcasting the specific CAG cell, the base station may optionally send the fourth indication information of the specific CAG cell.

The UE compares the locally configured allowed CAG list with the specific CAG cell and selects the specific CAG cell, or directly selects the specific CAG cell based on an indication or policy. If the UE is locally CAG only and a list is empty, the UE directly uses the specific CAG cell.

The UE sends an access request using the selected cell. The access request may be a registration request or a service request. For steps in which the UE requests to access the network and performs configuration update later, refer to related steps in other embodiments of this application. Details are not described herein again.

Figure 6:
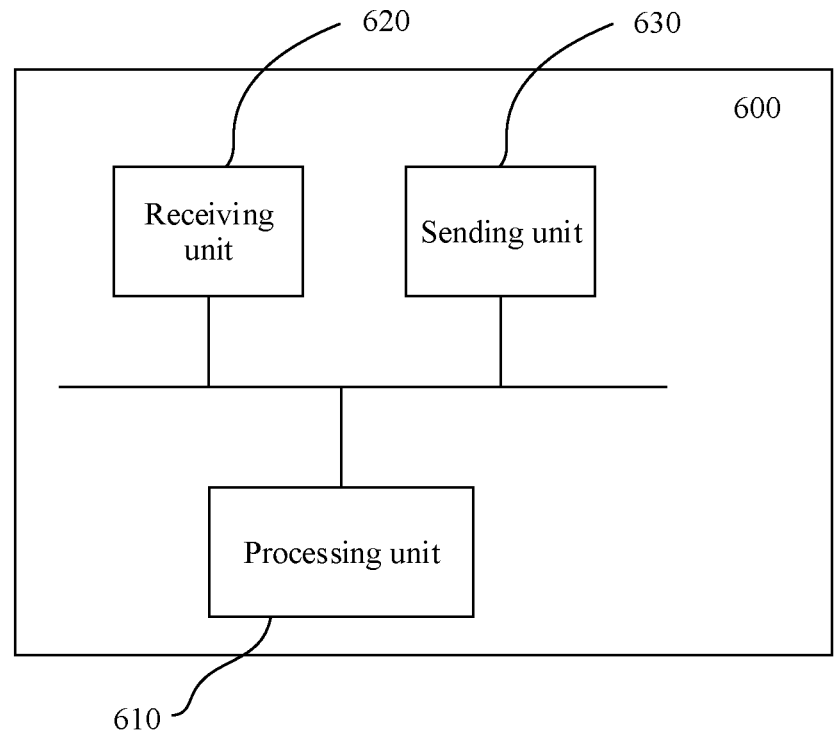
FIG. 6 is a schematic diagram of a configuration data update apparatus according to this application.

For example, FIG. 6 is a schematic diagram of a configuration data update apparatus according to an embodiment of this application. The apparatus is configured to perform the steps performed by the UE in any method embodiment of this application. The apparatus is used in a terminal device. As shown in FIG. 6, the apparatus 600 includes a processing unit 610, a receiving unit 620, and a sending unit 630. The processing unit 610 is configured to update configuration data. The receiving unit 620 is configured to receive indication information, a restriction indication or restriction information, configuration data, a cause value, a configuration update message, a reject message, an accept message, a related message in a link release procedure, or the like sent by a network side. The sending unit 630 is configured to send, to the network side, a message or information including a request message, a configuration update reply message, and the like. The apparatus may further include a storage unit, configured to store information, for example, the configuration data.

Figure 7:
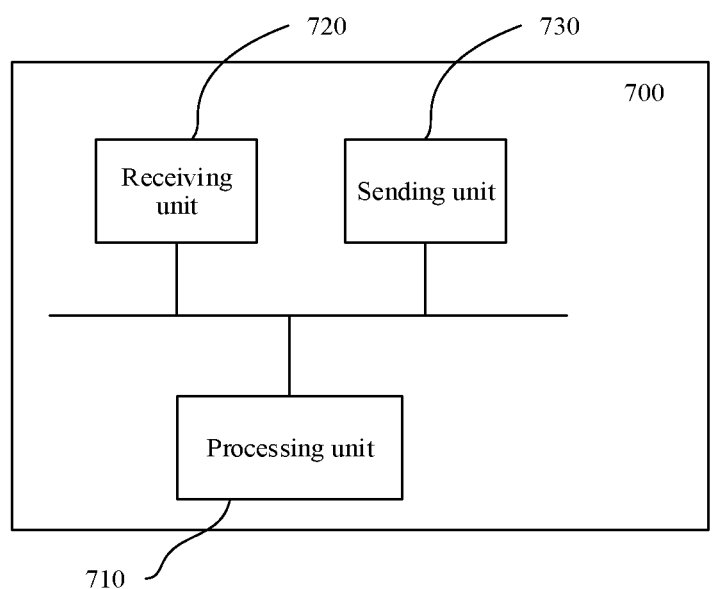
FIG. 7 is a schematic diagram of another configuration data update apparatus according to this application.

For example, FIG. 7 is a schematic diagram of another configuration data update apparatus according to an embodiment of this application. The apparatus is configured to perform the steps performed by the AMF or UDM in any method embodiment of this application. When the apparatus is used in an access and mobility management function network element, as shown in FIG. 7, the apparatus 700 includes a processing unit 710, a receiving unit 720, and a sending unit 730. The processing unit 710 is configured to: determine that configuration data of a terminal apparatus is first configuration data, and determine that the configuration data is updated to second configuration data, may be further configured to configure the terminal apparatus to be in a state in which the terminal apparatus is allowed to access a network through not only a CAG in a CAG list, and is configured to remove a restriction indication in a configuration message or replace the restriction indication in the configuration message. The receiving unit 720 is configured to receive the configuration data from a UDM. The sending unit 730 is configured to send the configuration data to the terminal apparatus.

In a possible implementation, the processing unit 710 is further configured to determine not to send the first configuration data to the terminal apparatus.

In a possible implementation, the receiving unit 720 is configured to receive a request message sent by the terminal apparatus, and the sending unit 730 is configured to send an accept message or a reject message to accept or reject the request message.

In a possible implementation, the sending unit 730 is configured to: send a configuration update message, and send a related message in a connection release procedure.

In a possible implementation, the processing unit 710 is further configured to use a NAS security context to perform confidentiality and/or integrity protection on the reject message or the configuration update message.

In a possible implementation, the sending unit 730 is further configured to send a cause value, a restriction indication, another indication message, and the like.

The apparatus may further include a storage unit, configured to store the configuration data.

It should be understood that division into the units in the foregoing apparatuses is merely logical function division. During actual implementation, all or some of the units may be integrated into a physical entity, or may be physically separate. In addition, all the units in the apparatuses may be implemented in a form of software invoked by a processing element, or may be implemented in a form of hardware; or some units may be implemented in a form of software invoked by a processing element, and some units may be implemented in a form of hardware. For example, each unit may be an independently disposed processing element, or may be integrated into a chip of the apparatus for implementation. Alternatively, each unit may be stored in a memory in a form of a program to be invoked by a processing element of the apparatus to perform a function of the unit. In addition, all or some of the units may be integrated together, or may be implemented independently. The processing element herein may also be referred to as a processor, and may be an integrated circuit having a signal processing capability. In an implementation process, the steps in the foregoing methods or the foregoing units may be implemented using a hardware integrated logic circuit of the processor element, or may be implemented in a form of software invoked by the processing element.

For example, a unit in any one of the foregoing apparatuses may be one or more integrated circuits configured to implement the foregoing method, for example, one or more application-specific integrated circuits (ASICs), one or more microprocessors (DSPs), one or more field programmable gate arrays (FPGAs), or a combination of at least two types of the integrated circuits. For another example, when a unit in the apparatuses is implemented in a form of a program invoked by the processing element, the processing element may be a general-purpose processor, for example, a central processing unit (CPU), or another processor that can invoke the program. For still another example, the units may be integrated and implemented in a form of a system-on-a-chip (SoC).

The foregoing unit for receiving (for example, a receiving unit) is an interface circuit of the apparatus, and is configured to receive a signal from another apparatus. For example, when the apparatus is implemented in a form of a chip, the receiving unit is an interface circuit that is of the chip and that is configured to receive a signal from another chip or apparatus. The foregoing unit for sending (for example, a sending unit) is an interface circuit of the apparatus, and is configured to send a signal to another apparatus. For example, when the apparatus is implemented in a form of a chip, the sending unit is an interface circuit that is of the chip and that is configured to send a signal to another chip or apparatus.

Figure 8:
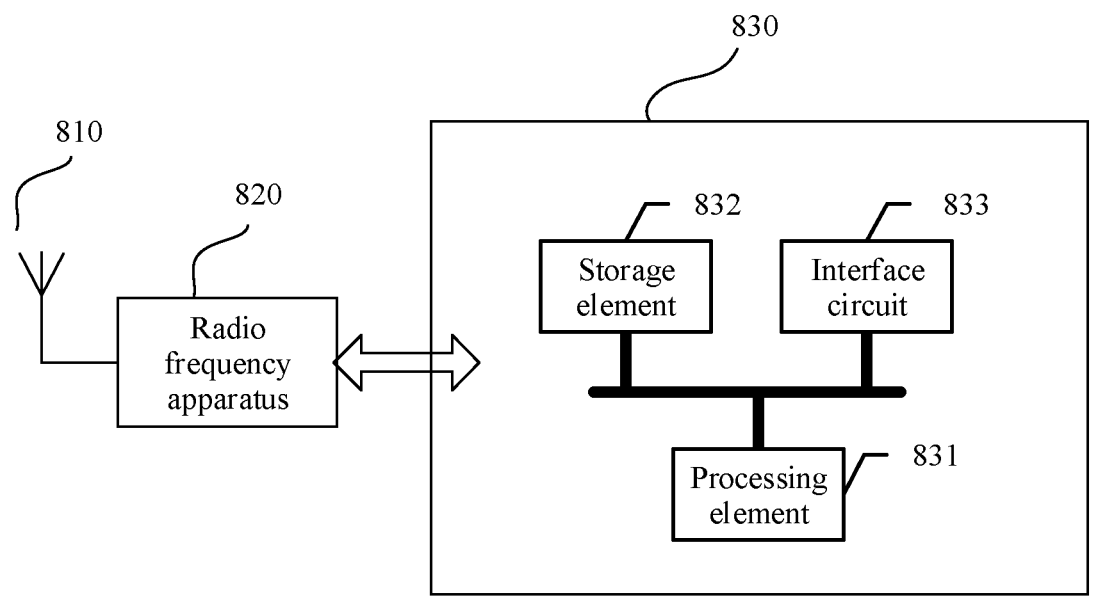
FIG. 8 is a schematic diagram of a terminal device according to this application.

FIG. 8 is a schematic diagram of a structure of a terminal device according to an embodiment of this application. The terminal device is configured to implement an operation of the terminal device in the foregoing embodiments. As shown in FIG. 8, the terminal device includes an antenna 810, a radio frequency apparatus 820, and a signal processing part 830. The antenna 810 is connected to the radio frequency apparatus 820. In a downlink direction, the radio frequency apparatus 820 receives information sent by an access network device using the antenna 810, and sends the information sent by the access network device to the signal processing part 830 for processing. In an uplink direction, the signal processing part 830 processes information of the terminal device, and sends the information to the radio frequency apparatus 820. After processing the information of the terminal device, the radio frequency apparatus 820 sends the information to the access network device using the antenna 810.

The signal processing part 830 is configured to process data at each communication protocol layer. The signal processing part 830 may be a subsystem of the terminal device. In this case, the terminal device may further include another subsystem, for example, a central processing subsystem, configured to implement processing of an operating system and an application layer of the terminal device; for another example, a peripheral subsystem, configured to connect to another device. The signal processing part 830 may be a separately disposed chip. Optionally, the foregoing apparatus may be located in the signal processing part 830.

The signal processing part 830 may include one or more processing elements 831, for example, include a main control CPU and another integrated circuit. In addition, the signal processing part 830 may further include a storage element 832 and an interface circuit 833. The storage element 832 is configured to store data and a program. A program used to perform the method performed by the terminal device in the foregoing method may be stored in the storage element 832, or may not be stored in the storage element 832. For example, the program is stored in a memory outside the signal processing part 830, and when the program is used, the signal processing part 830 loads the program into a cache for use. The interface circuit 833 is configured to communicate with an apparatus. The foregoing apparatus may be located in the signal processing part 830. The signal processing part 830 may be implemented using a chip. The chip includes at least one processing element and an interface circuit. The processing element is configured to perform the steps of any method performed by the terminal device. The interface circuit is configured to communicate with another apparatus. In an implementation, units that implement the steps in the foregoing method may be implemented by scheduling a program by a processing element. For example, the apparatus includes a processing element and a storage element. The processing element invokes a program stored in the storage element, to perform the method performed by the terminal device in the foregoing method embodiments. The storage element may be a storage element located on a same chip as the processing element, that is, an on-chip storage element.

Figure 9:
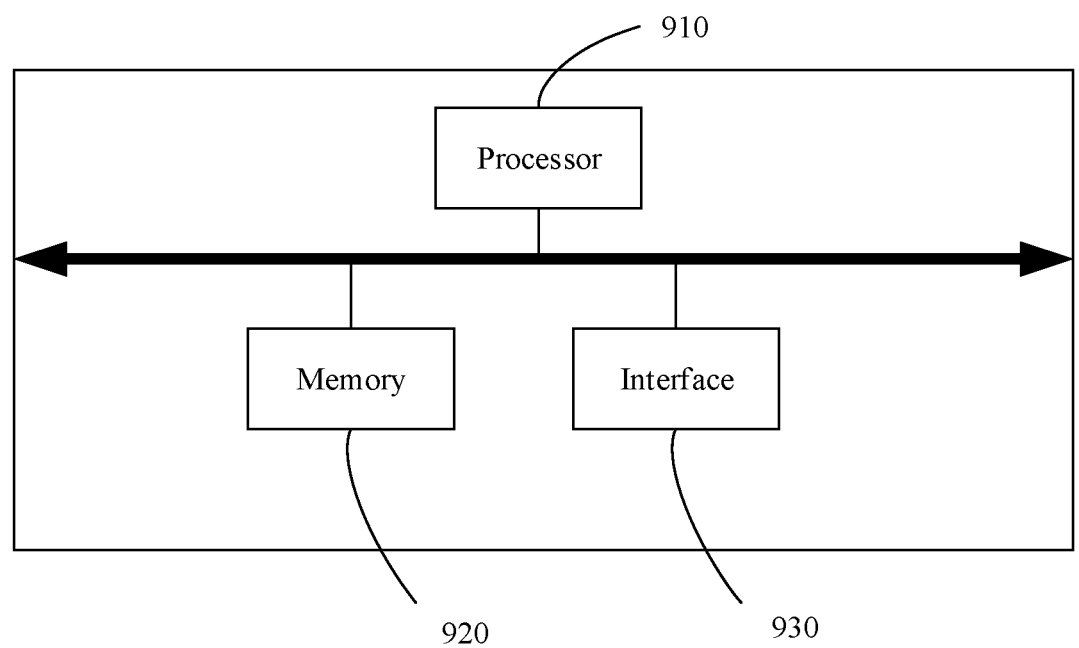
FIG. 9 is a schematic diagram of a structure of a configuration data update apparatus according to this application.

FIG. 9 is a schematic diagram of a structure of an apparatus according to an embodiment of this application. The apparatus is configured to implement operations of the AMF network element or the UDM network element in the foregoing embodiments. As shown in FIG. 9, when the apparatus is an AMF network element, the apparatus includes a processor 910, a memory 920, and an interface 930. The processor 910, the memory 920, and the interface 930 are signal-connected.

The methods performed by the AMF network element in the foregoing embodiments may be implemented by the processor 910 by invoking a program stored in the memory 920. In other words, an apparatus used in the AMF includes the memory and the processor. The memory is configured to store a program, and the program is invoked by the processor to perform the methods performed by the AMF network element in the foregoing method embodiments. The processor herein may be an integrated circuit having a signal processing capability, for example, a CPU. An apparatus used in a session management network element may be implemented by one or more integrated circuits configured to implement the foregoing method, for example, one or more ASICs, one or more microprocessors DSPs, one or more FPGAs, or a combination of at least two of the integrated circuits. Alternatively, the foregoing implementations may be combined.

An embodiment of this application further provides a system, where the system may include an AMF and a UDM. Optionally, the system further includes a RAN and UE.

The processor and the transceiver that are described in this application may be implemented on an integrated circuit (IC), an analog IC, a radio frequency integrated circuit RFIC, a hybrid signal IC, an application-specific integrated circuit (ASIC), a printed circuit board (PCB), an electronic device, or the like. The processor and the transceiver may also be manufactured using various IC technologies, for example, a complementary metal-oxide-semiconductor (CMOS), an n-type metal oxide semiconductor (NMOS), a p-type metal oxide semiconductor (PMOS), a bipolar junction transistor (BJT), a bipolar CMOS (BiCMOS), silicon germanium (SiGe), and gallium arsenide (GaAs).

In the descriptions of the foregoing embodiments, the AMF, the UDM, or the terminal apparatus is used as an example of the apparatus for description. However, a scope of the apparatus described in this application is not limited to the access network apparatus or the terminal apparatus, and a structure of the apparatus may not be limited by the accompanying drawings. The apparatus may be an independent device, or may be a part of a large device. For example, the device may be:

(1) an independent integrated circuit IC, a chip, or a chip system or subsystem;
(2) a set having one or more ICs, where optionally, the IC set may also include a storage component configured to store data and/or instructions;
(3) an ASIC, for example, a modem (MSM);
(4) a module that can be embedded in another device;
(5) a receiver, a terminal, a cellular phone, a wireless device, a handheld device, a mobile unit, a network device, or the like; or
(6) others, or the like.

In addition, the terms "system" and "network" are usually used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that, in embodiments of this application, "B corresponding to A" indicates that B is associated with A, and B may be determined based on A. However, it should be further understood that determining B based on A does not mean that B is determined based only on A, and B may alternatively be determined based on A and/or other information.

Aspects or features in embodiments of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to a magnetic storage component (for example, a hard disk drive, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media for storing information. The term "machine-readable media" may include but is not limited to a wireless channel, and various other media that can store, include, and/or carry instructions and/or data.

A person of ordinary skill in the art may be aware that, with reference to the units and algorithm steps described in the examples of embodiments disclosed in this specification, the embodiments of this application may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in another manner. For example, the described apparatus embodiment is merely an example. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to other approaches, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes: any medium that can store program code, such as a Universal Serial Bus (USB) flash drive, a removable hard disk, a read-only memory (ROM), a random access memory (RAM), a magnetic disk, or an optical disc.

The foregoing descriptions are merely example implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
    obtaining, by an access and management apparatus, an updated closed access group (CAG) list for a terminal apparatus, wherein the updated CAG list comprises a set of CAG identifiers (IDs) of CAG cells that the terminal apparatus is allowed to access;
    receiving, by the access and mobility management apparatus, an access request of the terminal apparatus, wherein the access request comprises a registration request or a service request; and
    in response to determining that a cell currently accessed by the terminal apparatus is not in the updated CAG list, sending, by the access and mobility management apparatus, response information to the terminal apparatus to reject the access request,
    wherein the response information comprises the updated CAG list.

2. The method of claim 1, wherein the response information further comprises a cause value indicating the terminal apparatus to update a stored CAG list to the updated CAG list.

3. The method of claim 1, wherein the response information is integrity protected using a non-access stratum (NAS) security context.

4. The method of claim 3, wherein when the NAS security context in the access and mobility management apparatus is unavailable, the method further comprises activating, by the access and mobility management apparatus, the NAS security context.

5. The method of claim 1, further comprising determining, by the access and mobility management apparatus, that the cell currently accessed by the terminal apparatus is not in the updated CAG list.

6. The method of claim 5, wherein determining that the cell currently accessed by the terminal apparatus is not in the updated CAG list comprises receiving, by the access and mobility management apparatus from a base station, information about the CAG cell currently accessed by the terminal apparatus.

7. The method of claim 1, wherein obtaining the updated CAG list comprises receiving, by the access and mobility management apparatus and from a unified data management apparatus, a Nudm_SDM_Notification message, and wherein the Nudm_SDM_Notification message comprises the updated CAG list.

8. The method of claim 1, wherein the updated CAG list is not configured to the terminal apparatus before receiving the access request of the terminal apparatus.

9. A method, comprising:
    sending, by a terminal apparatus, an access request to an access and mobility management apparatus, wherein the access request comprises a registration request or a service request;
    receiving, by the terminal apparatus from the access and mobility management apparatus, response information rejecting the access request, wherein the response information comprises an updated closed access group (CAG) list for the terminal apparatus, and wherein the updated CAG list comprises a set of CAG identifiers (IDs) of CAG cells that the terminal apparatus is allowed to access; and
    updating, by the terminal apparatus, a CAG list stored in of the terminal apparatus to the updated CAG list.

10. The method of claim 9, wherein the response information further comprises a cause value, and wherein updating the CAG list comprises updating, by the terminal apparatus, the CAG list stored in the terminal apparatus to the updated CAG list according to the cause value.

11. The method of claim 9, wherein the response information is integrity-protected using a non-access stratum (NAS) security context.

12. The method of claim 9, further comprising selecting, by the terminal apparatus, a CAG cell to access a network based on the updated CAG list.

13. The method of claim 9, wherein the updated CAG list is not configured to the terminal apparatus before sending the access request to the access and mobility management apparatus.

14. The method of claim 11, wherein before the updating the CAG list stored in the terminal apparatus to the updated CAG list, the method further comprises performing, by the terminal apparatus, an integrity check on the response information successfully.

15. An apparatus, comprising:
    at least one processor; and
    a memory coupled to the at least one processor and configured to store executable instructions for execution by the at least one processor to cause the at least one processor to:
        obtain an updated closed access group (CAG) list for a terminal apparatus, wherein the updated CAG list comprises a set of CAG identifiers (IDs) of CAG cells that the terminal apparatus is allowed to access;
        receive an access request of the terminal apparatus, wherein the access request comprises a registration request or a service request; and
        in response to determining that a cell currently accessed by the terminal apparatus is not in the updated CAG list, send response information to the terminal apparatus to reject the access request,
        wherein the response information comprises the updated CAG list.

16. The apparatus of claim 15, wherein the response information further comprises a cause value indicating the terminal apparatus to update a stored CAG list to the updated CAG list.

17. The apparatus of claim 15, wherein the response information is integrity protected using a non-access stratum (NAS) security context.

18. The apparatus of claim 17, wherein when the NAS security context in the apparatus is unavailable, the executable instructions further cause the at least one processor to activate the NAS security context.

19. An apparatus, comprising:
at least one processor; and
a memory coupled to the at least one processor and configured to store executable instructions for execution by the at least one processor to cause the at least one processor to:
  send an access request to an access and mobility management apparatus, wherein the access request comprises a registration request or a service request;
  receive, from the access and mobility management apparatus, response information rejecting the access request, wherein the response information comprises an updated closed access group (CAG) list for the apparatus, and wherein the updated CAG list comprises a set of CAG identifiers (IDs) of CAG cells that the apparatus is allowed to access; and
  update a CAG list stored in the apparatus to the updated CAG list.

20. The apparatus of claim 19, wherein the response information further comprises a cause value, and wherein the cause value instructs the apparatus to update the CAG list stored in the apparatus to the updated CAG list.

21. The apparatus of claim 19, wherein the response information is integrity-protected using a non-access stratum (NAS) security context.

22. A non-transitory computer storage medium configured to store instructions that, when executed by a processor, cause the processor to:
  obtain an updated closed access group (CAG) list for a terminal apparatus, wherein the updated CAG list comprises a set of CAG identifiers (IDs) of CAG cells that the terminal apparatus is allowed to access;
  receive an access request of the terminal apparatus, wherein the access request comprises a registration request or a service request; and
  in response to determining that a cell currently access by the terminal apparatus is not in the updated CAG list, send response information to the terminal apparatus to reject the access request,
  wherein the response information comprises the updated CAG list.

23. A non-transitory computer storage medium configured to store instructions that, when executed by a processor of an apparatus, cause the processor to:
  send an access request to an access and mobility management apparatus, wherein the access request comprises a registration request or a service request;
  receive response information rejecting the access request, wherein the response information comprises an updated closed access group (CAG) list for the apparatus, and wherein the updated CAG list comprises a set of CAG identifiers (IDs) of CAG cells that the apparatus is allowed to access; and
  update a CAG list stored in the apparatus to the updated CAG list.

* * * * *

UNITED STATES PATENT AND TRADEMARK OFFICE
CERTIFICATE OF CORRECTION

PATENT NO. : 12,262,203 B2
APPLICATION NO. : 17/708841
DATED : March 25, 2025
INVENTOR(S) : Longhua Guo Page 1 of 1

It is certified that error appears in the above-identified patent and that said Letters Patent is hereby corrected as shown below:

On the Title Page

Page 2, Column 2, Line 21, (56) References Cited, Other Publications add: "QUALCOMM INCORPORATED, "Handling of Allowed CAG list during registration," 3GPP DRAFT, S2-1907042, 3GPP TSG-SA WG2 Meeting #133 Sapporo, Japan, 23-28 June 2019, 15 pages."

Signed and Sealed this
Twentieth Day of May, 2025

Coke Morgan Stewart
*Acting Director of the United States Patent and Trademark Office*